(12) United States Patent
Takaira et al.

(10) Patent No.: US 9,376,015 B2
(45) Date of Patent: Jun. 28, 2016

(54) CONTROL APPARATUS FOR 4WD VEHICLE

(71) Applicant: Toyota Jidosha Kabushiki Kaisha, Toyota-shi Aichi-ken (JP)

(72) Inventors: Koji Takaira, Okazaki (JP); Kunihiro Iwatsuki, Toyota (JP); Hiroyuki Ishii, Nisshin (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 0 days.

(21) Appl. No.: 14/708,612

(22) Filed: May 11, 2015

(65) Prior Publication Data

US 2015/0328983 A1    Nov. 19, 2015

(30) Foreign Application Priority Data

May 16, 2014 (JP) .................. 2014-102878

(51) Int. Cl.
*B60K 17/354* (2006.01)
*B60K 23/08* (2006.01)

(52) U.S. Cl.
CPC .............. *B60K 23/08* (2013.01); *B60K 17/354* (2013.01); *B60K 2023/0858* (2013.01); *B60Y 2300/74* (2013.01); *B60Y 2400/82* (2013.01)

(58) Field of Classification Search
CPC ...... B60K 17/34; B60K 17/354; B60K 23/08; B60K 2023/085; B60K 2023/0858; B60K 2023/0875; B60Y 2300/74; B60Y 2400/82
See application file for complete search history.

(56) References Cited

U.S. PATENT DOCUMENTS

| 5,704,444 | A | * | 1/1998 | Showalter | B60K 23/0808 180/197 |
| 6,005,358 | A | * | 12/1999 | Radev | B60K 17/356 180/65.7 |
| 6,549,840 | B1 | * | 4/2003 | Mikami | B60K 6/365 180/243 |
| 7,299,120 | B2 | * | 11/2007 | Serebrennikov | B60W 30/20 701/37 |
| 8,177,672 | B2 | * | 5/2012 | Kato | B60K 17/344 475/198 |
| 8,204,657 | B2 | | 6/2012 | Buszek et al. | |
| 8,620,546 | B2 | * | 12/2013 | Kobayashi | B60K 17/348 180/248 |
| 8,721,493 | B2 | * | 5/2014 | Burgbacher | B60K 17/35 475/223 |
| 9,057,430 | B2 | * | 6/2015 | Horaguchi | B60K 17/3515 180/233 |
| 9,174,538 | B2 | * | 11/2015 | Zawade | B60K 37/06 |
| 2009/0057047 | A1 | * | 3/2009 | Beechie | B60K 23/08 180/233 |
| 2010/0094519 | A1 | * | 4/2010 | Quehenberger | B60K 17/35 701/69 |

FOREIGN PATENT DOCUMENTS

JP          2010-100280 A      5/2010

* cited by examiner

*Primary Examiner* — Joseph Rocca
*Assistant Examiner* — Marc A Scharich
(74) *Attorney, Agent, or Firm* — Dinsmore & Shohl LLP

(57) ABSTRACT

A control apparatus for a 4WD vehicle is provided. The control apparatus includes a driving force source, main driving wheels, auxiliary driving wheels, a driving force transmission shaft, a first disconnection mechanism, a second disconnection mechanism, and an electronic control unit. The electronic control unit is configured to: (i) control one of the first disconnection mechanism and the second disconnection mechanism to be engaged and then engage the other one of the first disconnection mechanism and the second disconnection mechanism when a disconnect state is canceled; and (ii) set, when the disconnect state is canceled, an increasing gradient of a rotation speed of the driving force transmission shaft in accordance with a condition that the electronic control unit determines to cancel the disconnect state.

16 Claims, 4 Drawing Sheets

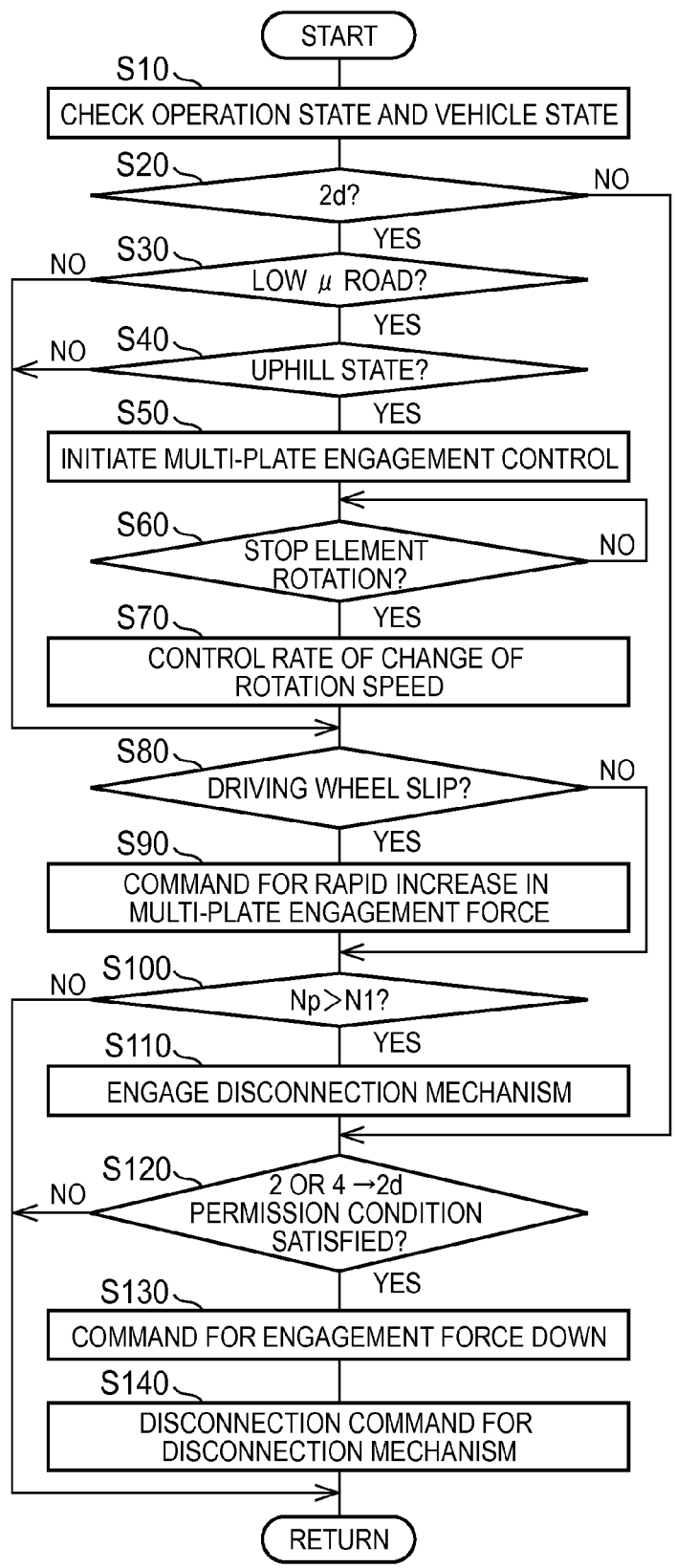

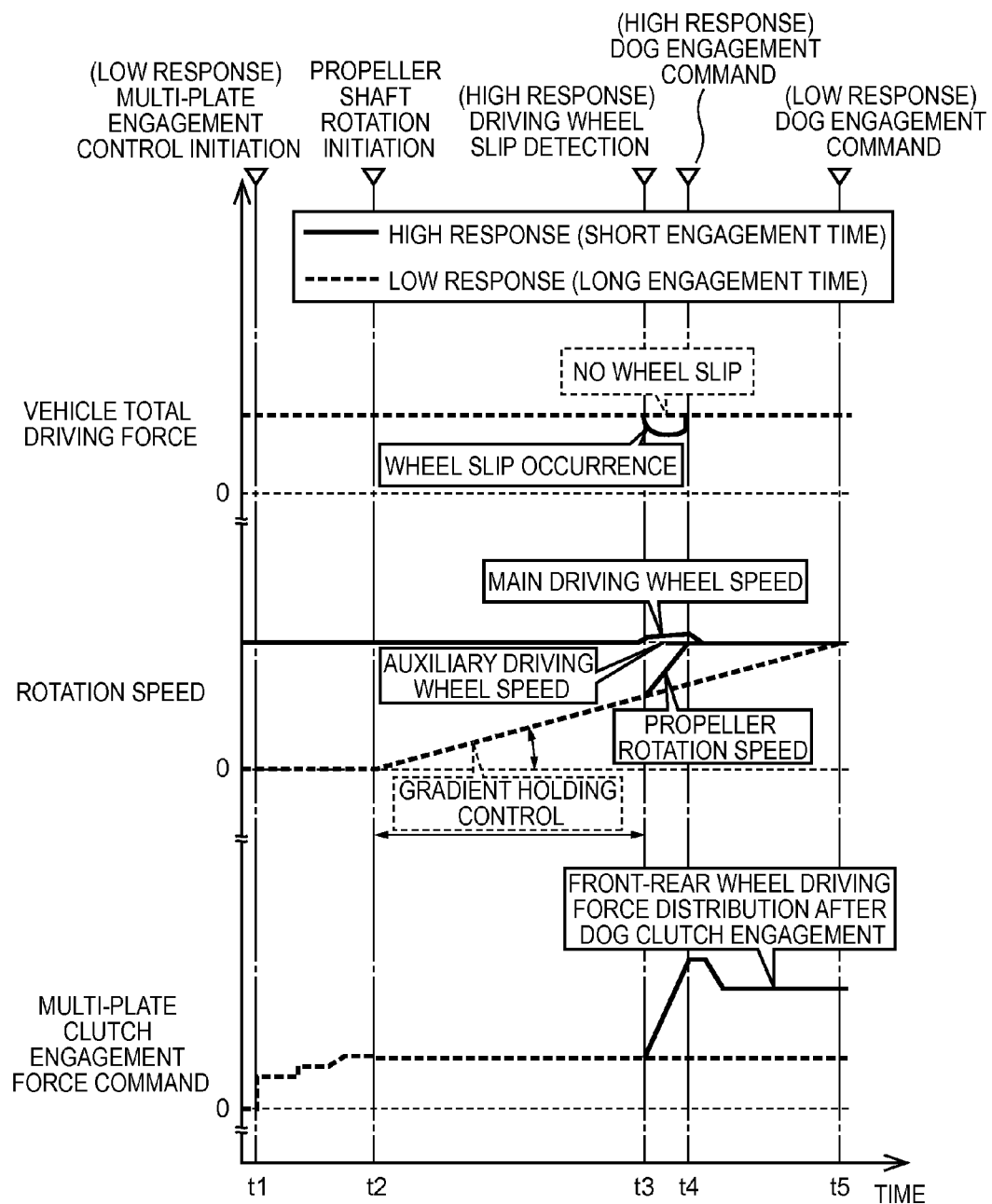

CONTROL APPARATUS FOR 4WD VEHICLE

INCORPORATION BY REFERENCE

The disclosure of Japanese Patent Application No. 2014-102878 filed on May 16, 2014 including the specification, drawings and abstract is incorporated herein by reference in its entirety.

BACKGROUND OF THE INVENTION

1. Field of the Invention

The invention relates to a control apparatus that switches operation states of two disconnect mechanisms in accordance with a traveling state of a four wheel drive (4WD) vehicle. The 4WD vehicle is provided with two disconnection mechanisms that are disposed on a driving force source side and an auxiliary driving wheels side of apparatus a driving force transmission shaft, respectively, as the disconnect mechanisms.

2. Description of Related Art

4WD vehicles that are provided with two disconnection mechanisms as disconnect mechanisms are widely known. The two disconnection mechanisms are disposed on a driving force source side and an auxiliary driving wheels side of a driving force transmission shaft (for example, propeller shaft), respectively, the driving force transmission shaft transmitting power of the driving force source during 4WD traveling to the auxiliary driving wheels side becoming driven wheels during two wheel drive (2WD) traveling. One of the examples is a vehicle that is described in Japanese Patent Application Publication No. 2010-100280 (JP 2010-100280 A). In this 4WD vehicle, the two disconnection mechanisms are released during 2WD traveling, and thus the rotation of the driving force transmission shaft and the like between the two disconnection mechanisms can be stopped. In this case, fuel efficiency can be improved compared to a case where only one of the two disconnection mechanisms is released during 2WD traveling. In addition, various techniques have been proposed with regard to control for transition from 2WD traveling to 4WD traveling in the 4WD vehicle. JP 2010-100280 A discloses a technique in which, for example, control is performed so that a torque-variable multi-plate clutch (corresponding to one of the two disconnection mechanisms) is engaged in a case where the main driving wheels slip during 2WD traveling so that the rotation speed of a torque transmission section (corresponding to the propeller shaft) is increased, the relative rotation speed of the dog clutch (corresponding to the other one of the two disconnection mechanisms) is substantially synchronized, and the dog clutch is engaged. In addition, JP 2010-100280 A discloses a technique for accelerating the torque transmission section so that the acceleration of the vehicle does not exceed an acceleration limit value rarely felt by a driver by the acceleration of the torque transmission section. In addition, it is disclosed that this acceleration limit value is set in advance depending on environmental factors such as road surface conditions, a wheel slip value, a pedal position, and a steering wheel position.

SUMMARY OF THE INVENTION

The technique disclosed in JP 2010-100280 A is to change the acceleration (speed until synchronization) of the driving force transmission shaft depending on the environmental factors within a range in which the driver does not feel a shock attributable to the acceleration of the rotation of the driving force transmission shaft. Accordingly, the technique cannot respond to a case where responsiveness is required more than the suppression of the shock described above. In the technique disclosed in JP 2010-100280 A, one of the two disconnection mechanisms is operated to be engaged from a moment of determination for transition to 4WD traveling when the occurrence of the wheel slip is detected even in a case where the transition to 4WD traveling is urgent. Accordingly, there is room for improvement relating to the responsiveness of the transition to 4WD traveling. The problem described above is not known.

The invention provides a control apparatus for a 4WD vehicle that is capable of suppressing a shock in canceling a disconnect state and quickly canceling the disconnect state in accordance with the degree of urgency of transition to 4WD traveling.

According to a first aspect of the invention, there is provided a control system for a 4WD vehicle. The control apparatus includes a driving force source, main driving wheels, auxiliary driving wheels, a driving force transmission shaft, a first disconnection mechanism, a second disconnection mechanism, and an electronic control unit. The driving force transmission shaft is configured to transmit part of the power of the driving force source transmitted to the main driving wheels to the auxiliary driving wheels during 4WD traveling. The first disconnection mechanism is disposed on the driving force source side of the driving force transmission shaft. The second disconnection mechanism is disposed on the auxiliary driving wheels side of the driving force transmission shaft. The first disconnection mechanism and the second disconnection mechanism are configured to disconnect a power transmission path between the driving force source and the auxiliary driving wheels. The electronic control unit is configured to: (i) control one of the first disconnection mechanism and the second disconnection mechanism to be engaged and then engage the other one of the first disconnection mechanism and the second disconnection mechanism when a disconnect state is canceled, the disconnect state being a state where both the first disconnection mechanism and the second disconnection mechanism are released; and (ii) set, when the disconnect state is canceled, an increasing gradient of a rotation speed of the driving force transmission shaft in accordance with a condition that the electronic control unit determines to cancel the disconnect state.

According to the aspect described above, the increasing gradient of the rotation speed of the driving force transmission shaft is set in accordance with a condition when the electronic control unit determines to cancel the disconnect state. Accordingly, the aspect of the increase in the rotation speed of the driving force transmission shaft can be changed in accordance with the degree of urgency of transition to 4WD traveling. Accordingly, the disconnect state can be canceled with the increasing gradient relatively small and the shock suppressed in a case where the transition to 4WD traveling is not urgent. In a case where the transition to 4WD traveling is urgent, the disconnect state can be quickly canceled with the increasing gradient relatively large. Accordingly, the shock in canceling the disconnect state can be suppressed or the disconnect state can be quickly canceled in accordance with the degree of urgency of transition to 4WD traveling.

BRIEF DESCRIPTION OF THE DRAWINGS

Features, advantages, and technical and industrial significance of exemplary embodiments of the invention will be described below with reference to the accompanying drawings, in which like numerals denote like elements, and wherein:

FIG. 3 is a flowchart showing a main part of a control operation by the electronic control unit, that is, a control operation for suppressing a shock in canceling a disconnect state or quickly canceling the disconnect state in accordance with the degree of urgency of transition to 4WD traveling; and FIG. 4 is an example of a time chart for a case where the control operation that is illustrated in the flowchart in FIG. 3 is executed.

DETAILED DESCRIPTION OF EMBODIMENTS

Hereinafter, embodiments of the invention will be described in detail with reference to the accompanying drawings.

Figure 1:
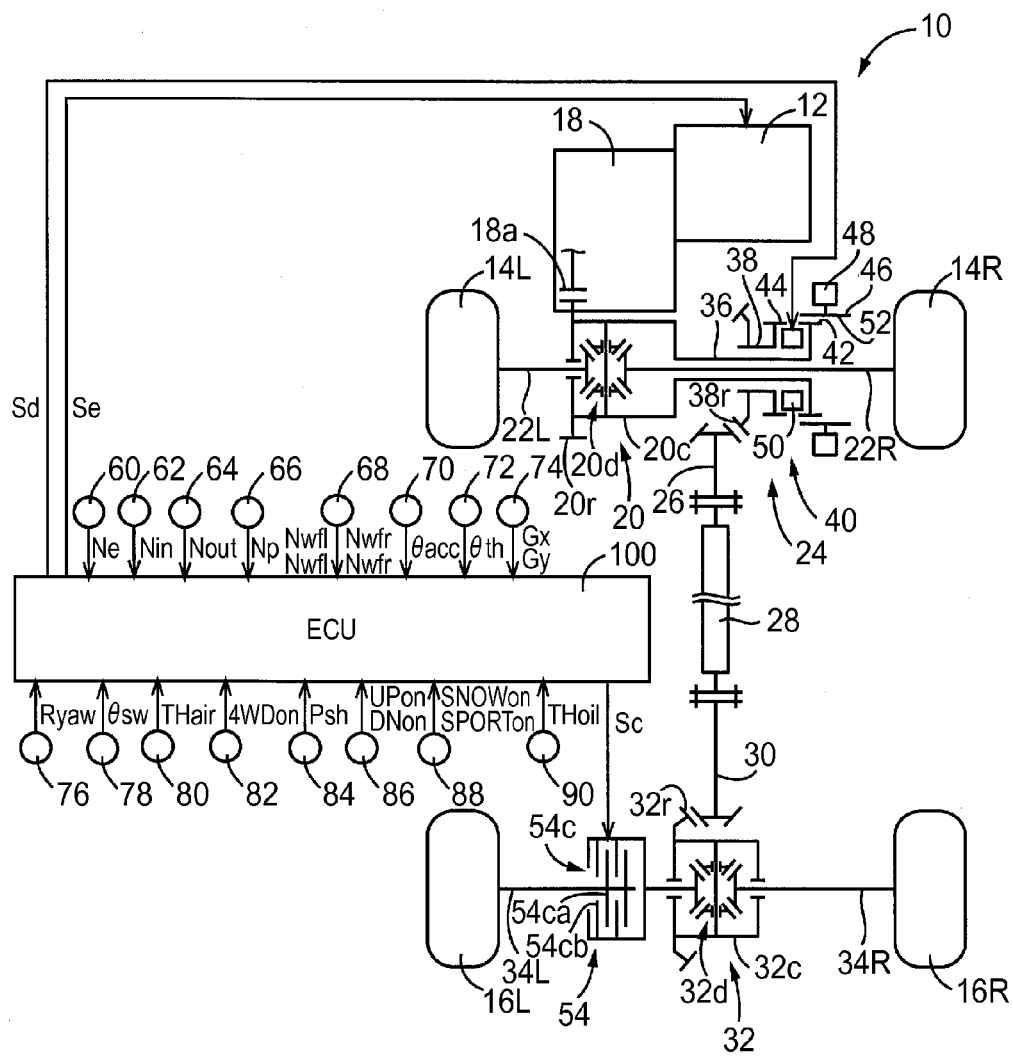
FIG. 1 is a skeleton diagram showing a schematic configuration of a 4WD vehicle to which the invention is applied and is a diagram showing a main part of a control apparatus of the vehicle.

FIG. 1 is a skeleton diagram showing a schematic configuration of a 4WD vehicle 10 (hereinafter, referred to as a vehicle 10) to which the invention is applied. FIG. 1 is a diagram showing a main part of a control apparatus for various types of control in the vehicle 10. According to FIG. 1, the vehicle 10 is provided with an engine 12, right and left front wheels 14R, 14L (hereinafter, referred to as front wheels 14 if not particularly distinguished), right and left rear wheels 16R, 16L (hereinafter, referred to as rear wheels 16 if not particularly distinguished), a first power transmission path that is a power transmission path between the engine 12 and the front wheels 14 and transmits the power of the engine 12 to the front wheels 14, a second power transmission path that is a power transmission path between the engine 12 and the rear wheels 16 and transmits the power of the engine 12 to the rear wheels 16, and the like.

The engine 12 is an internal combustion engine such as a gasoline engine and a diesel engine. Accordingly, the engine 12 is a driving force source that generates a driving force. The front wheels 14 are main driving wheels that are driving wheels for both 2WD traveling and 4WD traveling. The rear wheels 16 are auxiliary driving wheels that are driven wheels during 2WD traveling and driving wheels during 4WD traveling to which the power from the engine 12 is transmitted via the second power transmission path. Accordingly, the vehicle 10 is a FF-based 4WD vehicle.

The first power transmission path is provided with a transmission 18, a front differential 20, right and left front wheel axles 22R, 22L (hereinafter, referred to as front wheel axles 22 if not particularly distinguished), and the like. The second power transmission path is provided with a transfer 24, a driven pinion 26, a propeller shaft 28, a drive pinion 30, a rear differential 32, right and left rear wheel axles 34R, 34L (hereinafter, referred to as rear wheel axles 34 if not particularly distinguished), and the like. The transfer 24 is a front-rear wheel power distribution device which distributes part of the power of the engine 12 transmitted to the transmission 18 and the front wheels 14 to the rear wheels 16. The propeller shaft 28 is a driving force transmission shaft which transmits the power from the engine 12 distributed by the transfer 24 to the rear wheels 16 during 4WD traveling.

The transmission 18 constitutes a part of a power transmission path that is common to the first power transmission path between the engine 12 and the front wheels 14 and the second power transmission path between the engine 12 and the rear wheels 16. The transmission 18 transmits the power of the engine 12 to the front wheels 14 side and the rear wheels 16 side. The transmission 18 is an automatic transmission. For example, the transmission 18 is a known planetary gear-type multi-speed transmission in which a plurality of gearshift stages having different gear ratios (transmission gear ratios) γ (=transmission input rotation speed Nin/transmission output rotation speed Nout) are selectively satisfied. Alternatively, the transmission 18 is, for example, a known continuously variable transmission in which the gear ratios γ change steplessly and continuously. Alternatively, the transmission 18 is a known synchromesh-type parallel two-shaft transmission.

The front differential 20 is configured to include a differential case 20c and a differential mechanism 20d that has a bevel gear. The front differential 20 is a known differential gear that transmits rotation while applying an appropriate differential rotation to the right and left front wheel axles 22R, 22L. A ring gear 20r is disposed in the differential case 20c. The ring gear 20r meshes with an output gear 18a that is an output rotating member of the transmission 18. Accordingly, the power that is output from the transmission 18 is input to the ring gear 20r.

The transfer 24 is disposed in parallel to the front differential 20 as a rotating member that constitutes a part of the first power transmission path. The transfer 24 is connected to the front differential 20. The transfer 24 is configured to include a first rotating member 36, a second rotating member 38, and a front side clutch 40.

The first rotating member 36 has a substantially cylindrical shape. The front wheel axle 22R penetrates an inner circumferential side of the first rotating member 36. Fitting teeth that are fitted into fitting teeth (not illustrated) which are disposed in the differential case 20c of the front differential 20 are disposed on one axial side of the first rotating member 36. The first rotating member 36 is integrally connected to the differential case 20c. In other words, the first rotating member 36 integrally rotates with the differential case 20c. Clutch teeth 42 that constitute a part of the front side clutch 40 are disposed on the other axial side of the first rotating member 36.

The second rotating member 38 has a substantially cylindrical shape. The front wheel axle 22R and the first rotating member 36 penetrate an inner circumferential side of the second rotating member 38. A ring gear 38r that is used to transmit the power of the engine 12 to the rear wheels 16 and meshes with the driven pinion 26 is disposed on one axial side of the second rotating member 38. Clutch teeth 44 that constitute a part of the front side clutch 40 are disposed on the other axial side of the second rotating member 38. The driven pinion 26 that meshes with the ring gear 38r is connected to the propeller shaft 28. The driven pinion 26 is connected to the drive pinion 30 via the propeller shaft 28.

The front side clutch 40 is a clutch for selective disconnection between the first rotating member 36 and the second rotating member 38 that are rotating members relative to each other. The front side clutch 40 is a dog clutch that is configured to include the clutch teeth 42, the clutch teeth 44, a sleeve 46, a holding member 48, and a front side actuator 50. In other words, the front side clutch 40 is a mesh clutch. The sleeve 46 has a substantially cylindrical shape. Inner circumferential teeth 52 that can mesh with the clutch teeth 42 and the clutch teeth 44 are disposed on an inner circumferential side of the sleeve 46. The sleeve 46 is configured to be axially moved by the front side actuator 50 that can be, for example, electrically (electromagnetically) controlled. In addition, the front side clutch 40 may be provided with a synchronization mechanism (synchro mechanism).

FIG. 1 illustrates a state where the front side clutch 40 is released. In this state, the connection between the first rotating member 36 and the second rotating member 38 is cut off. Accordingly, the power of the engine 12 is not transmitted to the rear wheels 16. If the sleeve 46 is moved and both the clutch teeth 42 and the clutch teeth 44 mesh with the inner circumferential teeth 52, the front side clutch 40 is engaged. Accordingly, the first rotating member 36 and the second rotating member 38 are connected to each other. Accordingly, when the first rotating member 36 rotates, the second rotating member 38, the driven pinion 26, the propeller shaft 28, and the drive pinion 30 rotate in conjunction. In this manner, the front side clutch 40 is a disconnection mechanism that is disposed on the engine 12 side of the propeller shaft 28. The disconnection mechanism is configured to disconnect the power transmission path between the front differential 20 and the propeller shaft 28 (the second power transmission path).

The rear differential 32 is configured to include a differential case 32c and a differential mechanism 32d that has a bevel gear. The rear differential 32 is a known differential gear that transmits rotation while applying an appropriate differential rotation to the right and left rear wheel axles 34R, 34L. A ring gear 32r is disposed in the differential case 32c. The ring gear 32r meshes with the drive pinion 30. Accordingly, the power of the engine 12 that is distributed by the transfer 24 is input to the ring gear 32r via the propeller shaft 28 and is transmitted to the rear wheels 16 via the rear differential 32.

In addition, the vehicle 10 is provided with a coupling 54 that constitutes a part of the second power transmission path. The coupling 54 is disposed between the rear differential 32 and the rear wheel axle 34L on the left side. The coupling 54 is, for example, a known electronically-controlled coupling that has a wet multi-plate clutch 54c, an electromagnetic solenoid (not illustrated) as a rear side actuator, and the like. The coupling 54 is configured to perform torque transmission between the rear differential 32 and the rear wheel axle 34L on the left side. The multi-plate clutch 54c is a friction clutch that has a plurality of inside clutch plates 54ca and a plurality of outside clutch plates 54cb as rotating members relative to each other. The driving force that is transmitted to the rear wheels 16 is controlled when, for example, an engagement force of the multi-plate clutch 54c of the coupling 54 (that is, a transmission torque of the coupling 54) is controlled.

Specifically, the propeller shaft 28 and the rear wheel axle 34L on the left side are connected to be capable of transmitting torque via the rear differential 32 and the like when the coupling 54 is engaged. In addition, the propeller shaft 28 and the rear wheel axle 34R on the right side are connected to be capable of transmitting torque via the rear differential 32 and the like. The torque from the propeller shaft 28 is not transmitted to the rear wheel axle 34L on the left side when the coupling 54 is released. As the torque from the propeller shaft 28 is not transmitted to the rear wheel axle 34L on the left side, the torque from the propeller shaft 28 is not transmitted to the rear wheel axle 34R on the right side, either. In other words, the torque from the propeller shaft 28 is not transmitted to the rear wheel axle 34R on the right side as well due to the general characteristics of the rear differential 32 as a differential gear. When a current is supplied to the electromagnetic solenoid (not illustrated) described above, the multi-plate clutch 54c is engaged at an engagement force proportional to the current value in the coupling 54. As the transmission torque of the coupling 54 increases, the driving force that is transmitted to the rear wheels 16 increases. With the transmission torque controlled, the coupling 54 can continuously change the torque distribution between the front wheels 14 and the rear wheels 16 between, for example, 100:0 to 50:50. In this manner, the coupling 54 is a disconnection mechanism that is disposed on the rear wheels 16 side of the propeller shaft 28. The disconnection mechanism is configured to disconnect the power transmission path between the propeller shaft 28 and the rear wheels 16 (that is, the second power transmission path). The coupling 54 is a clutch in which the transmission torque can be controlled between the release and engagement of the coupling 54. Accordingly, the coupling 54 is a clutch in which an engagement force can be controlled during a process for synchronizing the respective rotation speeds of the inside clutch plate 54ca and the outside clutch plate 54cb.

In the vehicle 10 that has the configuration described above, the driving force corresponding to the transmission torque of the coupling 54 is transmitted to the rear wheels 16 as well if, for example, the front side clutch 40 is engaged and the transmission torque of the coupling 54 is controlled to be a value exceeding zero. Accordingly, power is transmitted to both the front wheels 14 and the rear wheels 16 for 4WD traveling. During this 4WD traveling, the transmission torque of the coupling 54 is controlled and the torque distribution between the front wheels 14 and the rear wheels 16 is adjusted as needed.

In the vehicle 10, the connection between the first rotating member 36 and the second rotating member 38 is cut off if, for example, the front side clutch 40 is released. Accordingly, power is not transmitted to the rear wheels 16, and thus only the front wheels 14 are driven for 2WD traveling. If, for example, the coupling 54 that is an example of a rear side clutch is released in addition, rotation is transmitted neither from the engine 12 side nor from the rear wheels 16 side to the respective rotating elements during the 2WD traveling. The respective rotating elements constitute the power transmission path from the second rotating member 38 to the differential case 32c. The respective rotating elements include the second rotating member 38, the driven pinion 26, the propeller shaft 28, the drive pinion 30, the differential case 32c, and the like. Accordingly, during the 2WD traveling, the respective rotating elements stop rotating, the respective rotating elements are prevented from rotating in conjunction, and traveling resistance is reduced. The front side clutch 40 and the coupling 54 are two disconnection mechanisms that are respectively disposed on the engine 12 side and the rear wheels 16 side of the propeller shaft 28 so as to stop the rotation of a predetermined rotating element transmitting power to the rear wheels 16 during 4WD traveling by being operated to be released during 2WD traveling. In other words, the vehicle 10 is provided with the two disconnection mechanisms as disconnect mechanisms that stop the rotation of the predetermined rotating element by being operated during 2WD traveling so that the two disconnection mechanisms are released. The predetermined rotating element is the rotating element that is pinched by the front side clutch 40 and the coupling 54 among the rotating elements which constitute the power transmission path between the engine 12 and the rear wheels 16. In other words, the rotating element is the rotating element that constitutes the power transmission path from the second rotating member 38 to the differential case 32c. A driving state where the front side clutch 40 and the coupling 54 are released and the rotation of each of the rotating elements described above is stopped is a disconnect state where the rotation of the predetermined rotating element is stopped. The driving state described above is, in other words, a 2WD traveling state in which the rotation in conjunction is prevented. The 2WD traveling in this disconnect state will be described as 2WD_d traveling. During the 2WD_d traveling, it may be impossible to completely stop the rotation of the predetermined rotating element, due to the drag of the multi-plate clutch 54c, even if the coupling 54 is in a released state. However, the disconnect mechanism is disposed so as to stop the rotation of the predetermined rotating element. In other words, the disconnect mechanism is disposed to aim to stop the rotation. To stop the rotation of the predetermined rotating element also includes, in result, a state where the rotation of the predetermined rotating element occurs to some extent.

In the vehicle 10, power is not transmitted to the rear wheels 16 if the front side clutch 40 is engaged and the coupling 54 is released. Alternatively, in the vehicle 10, power is not transmitted to the rear wheels 16 if the front side clutch 40 is released and the coupling 54 is engaged. Accordingly, only the front wheels 14 are driven for 2WD traveling. During the 2WD traveling, the respective rotating elements that constitute the power transmission path from the second rotating member 38 to the differential case 32c rotate in conjunction. Accordingly, fuel efficiency decreases, by the amount of the rotation in conjunction of the propeller shaft 28 and the like, despite the 2WD traveling. However, when 2WD traveling is switched into 4WD traveling, prompt switching is allowed just by connecting the coupling 54. 2WD traveling in a connect state where only one of the front side clutch 40 and the coupling 54 is engaged will be described as 2WD_c traveling in some cases.

The vehicle 10 is switched between 2WD traveling and 4WD traveling as the disconnect state of the front side clutch 40 or the transmission torque of the coupling 54 is controlled in accordance with the traveling state of the vehicle 10.

The vehicle 10 is provided with an electronic control unit (ECU) 100. The electronic control unit (ECU) 100 includes a control device for the vehicle 10 which switches the operation states of the front side clutch 40 and the coupling 54 in accordance with, for example, the traveling state of the vehicle 10. The electronic control unit 100 is configured to include a so-called microcomputer that is provided with, for example, a CPU, a RAM, a ROM, an I/O interface, and the like. The CPU executes various types of control for the vehicle 10 by performing signal processing in accordance with a program stored in advance in the ROM while using a temporary storage function of the RAM. For example, the electronic control unit 100 executes output control for the engine 12, driving state switching control for the vehicle 10, and the like. The electronic control unit 100 is configured to be divided into those for engine control, driving state control, and the like as needed. As illustrated in FIG. 1, various actual values based on respective detection signals from various sensors provided in the vehicle 10 are supplied to the electronic control unit 100. Examples of the various sensors include various rotation speed sensors 60, 62, 64, 66, 68, an accelerator opening sensor 70, a throttle valve opening sensor 72, a G sensor 74, a yaw rate sensor 76, a steering sensor 78, an outside air temperature sensor 80, a 4WD selection switch 82, a shift position sensor 84, a paddle switch 86 as a manual transmission device for manual shift of the transmission 18, a traveling mode selection switch 88, and an oil temperature sensor 90. The 4WD selection switch 82 is a 4WD selection device that is used to select transition to 4WD traveling based on a driver's operation. The traveling mode selection switch 88 is a mode selection device that is used to select, based on a driver's operation, a predetermined snow mode in which the gear ratio γ of a high vehicle speed side (high side) of the transmission 18 is likely to be selected compared to a predetermined normal mode or a predetermined sport mode in which the gear ratio γ on a low vehicle speed side (low side) of the transmission 18 is likely to be selected compared to the predetermined normal mode. Examples of the various actual values include an engine rotation speed Ne, a transmission input rotation speed Nin, a transmission output rotation speed Nout, a propeller shaft rotation speed Np, respective vehicle wheel speeds Nwfl, Nwfr, Nwrl, Nwrr corresponding to rotation speeds (respective vehicle wheel speeds) Nw of respective vehicle wheels (that is, front wheels 14R, 14L and rear wheels 16R, 16L), an accelerator opening θacc, a throttle valve opening θth, a longitudinal acceleration Gx of the vehicle 10, a lateral acceleration Gy of the vehicle 10, a yaw rate Ryaw that is a rotation angular velocity about a vertical axis of the vehicle 10, a steering angle θsw and a steering direction of a steering wheel, an outside air temperature THair, a 4WD request 4WD on that is a signal showing the operation of the 4WD selection switch 82 by the driver, a shift position Psh that is a shift lever operation position, a downshift request DNon and an upshift request UPon that are signals showing the operation of the paddle switch 86 by the driver, a snow mode ON SNOWon and a sport mode ON SPORTon that are signals showing the operation of the traveling mode selection switch 88 by the driver, and the temperature of a hydraulic oil that lubricates the rotating member in the second power transmission path, for example, a hydraulic oil temperature THoil in the rear differential 32. As illustrated in FIG. 1, an engine output control command signal Se for output control for the engine 12, an operation command signal Sd for switching the state of the front side clutch 40, an engagement force command signal Sc for controlling the engagement force of the coupling 54 (multi-plate clutch 54c), and the like are respectively output to engine control devices such as a fuel injection device, an ignition device, and a throttle actuator, the front side actuator 50, the electromagnetic solenoid (not illustrated) for driving the coupling 54, and the like from the electronic control unit 100. The electronic control unit 100 calculates a speed V of the vehicle 10 (hereinafter, referred to as a vehicle speed V) as one of various actual values based on the respective vehicle wheel speeds Nw. For example, the electronic control unit 100 sets the average vehicle wheel speed of the respective vehicle wheel speeds Nw as the vehicle speed V.

Figure 2:
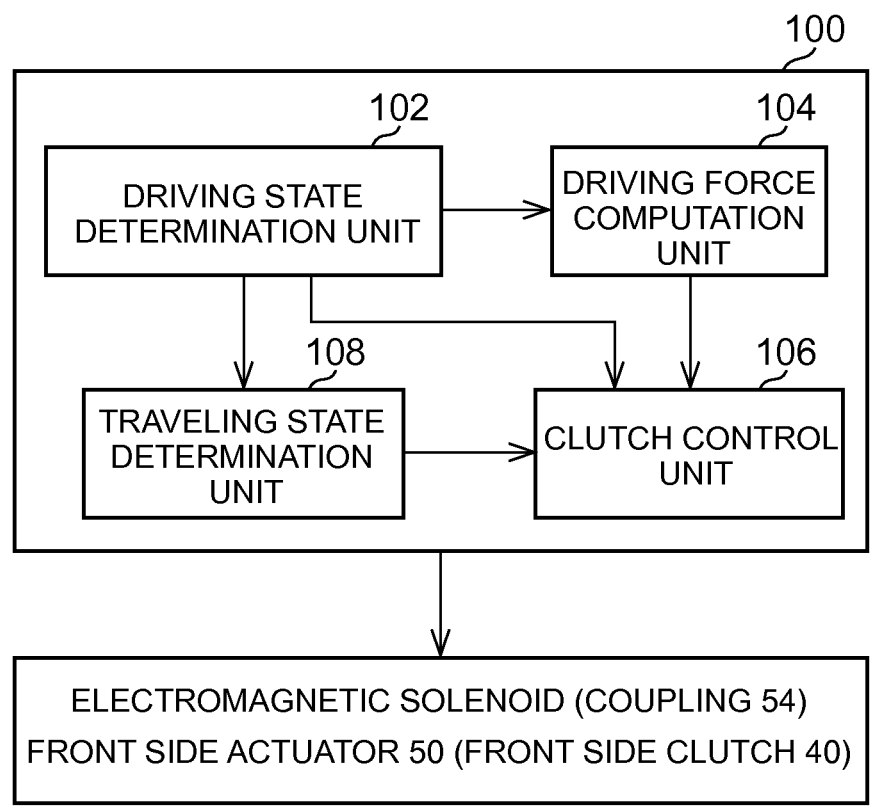
FIG. 2 is a functional block diagram showing a main part of a control function of an electronic control unit.

FIG. 2 is a functional block diagram showing a main part of a control function of the electronic control unit 100. According to FIG. 2, the electronic control unit 100 is provided with a driving state determination unit 102, a driving force computation unit 104, and a clutch control unit 106.

The driving state determination unit 102 determines an optimal driving state of the vehicle 10 based on information such as the various signals described above. Specifically, in a case where it is determined that the vehicle 10 is in a steady traveling state where a driving force change in the vehicle 10 is smaller than a driving force change threshold based on the accelerator opening θacc, the vehicle speed V, and the like, the driving state determination unit 102 determines the driving state of the vehicle 10 to be the 2WD_d traveling. The driving force change threshold is the value of a change in the driving force of the vehicle 10 which is obtained and stored in a prior experiment or design (that is, pre-defined). The 2WD_d traveling is 2WD traveling in which the traveling is performed in the disconnect state where both the front side clutch 40 and the coupling 54 are released. In a case where it is determined that the driving force change in the vehicle 10 exceeds the driving force change threshold, the driving state determination unit 102 determines the driving state of the vehicle 10 to be the 4WD traveling. The 4WD traveling is traveling in which the traveling is performed with the front side clutch 40 engaged and the coupling 54 engaged or slip-engaged. In addition, the driving state determination unit 102 determines whether or not the vehicle 10 is turning based on whether or not the respective absolute values of the steering angle θsw, the lateral acceleration Gy, and the yaw rate Ryaw are equal to or greater than respective turning determination thresholds θswth, Gyth, Ryawth which are pre-defined to determine that the vehicle is turning. In a case where it is determined that the vehicle 10 is not turning, the driving state determination unit 102 determines the driving state of the vehicle 10 to be the 2WD_d traveling. In addition, the driving state determination unit 102 determines, based on the respective vehicle wheel speeds Nw, whether or not a predetermined vehicle wheel speed difference as a 4WD determination threshold occurs between the respective vehicle wheels. The 4WD determination threshold is pre-defined to determine that it is desirable for the driving state of the vehicle 10 to be the 4WD traveling. In a case where it is determined that any one of rotation speed difference between the respective vehicle wheels exceeds the predetermined vehicle wheel speed difference, the driving state determination unit 102 determines the driving state of the vehicle 10 to be the 4WD traveling. In addition, the driving state determination unit 102 determines whether or not the vehicle 10 is being steered based on whether or not the absolute value of the steering angle θsw is equal to or greater than a predetermined steering angle θswth2. The predetermined steering angle θswth2 is a pre-defined steering determination threshold that is used to determine that the steering wheel is steered by the driver so as to turn the vehicle 10. In a case where it is determined that the vehicle 10 is being steered, the driving state determination unit 102 compares the actual yaw rate Ryaw to a target yaw rate Ryawtgt calculated based on the vehicle speed V, the steering angle θsw, and the like and determines whether or not any one of an understeer state and an oversteer state is occurring as a vehicle behavior. In a case where it is determined that any one of the understeer state and the oversteer state is occurring, the driving state determination unit 102 determines the driving state of the vehicle 10 to be the 4WD traveling. In addition, the driving state determination unit 102 determines whether the driving state of the vehicle 10 should be the 2WD traveling or the 4WD traveling based on the operation state of the 4WD selection switch 82. In a case where a 4WD request 4WDon signal input is present, the driving state determination unit 102 determines the driving state of the vehicle 10 to be the 4WD traveling. In this manner, the driving state determination unit 102 functions as a 4WD transition determination unit that determines whether or not to perform transition to 4WD traveling (hereinafter, if not particularly distinguished, the 4WD traveling includes the 2WD_c traveling in which the front side clutch 40 is engaged and the transmission torque of the coupling 54 is substantially zero) during the 2WD_d traveling.

The driving force computation unit 104 calculates an optimal front-rear wheel driving force distribution based on information such as the various signals described above. Specifically, the driving force computation unit 104 calculates an estimated value (estimated engine torque) Tep for an engine torque Te based on the engine rotation speed Ne, the throttle valve opening θth, and the like, and calculates the front-rear wheel driving force distribution to ensure the maximum acceleration performance. In a case where the driving state of the vehicle 10 is determined to be the 2WD_d traveling by the driving state determination unit 102, the driving force computation unit 104 turns the driving force distribution to the rear wheels 16 into zero. In addition, the driving force computation unit 104 reduces the driving force distribution to the rear wheels 16 in a case where it is determined that the driver's operation situation and the driving force change in the vehicle 10 are stable based on the throttle valve opening θth, the vehicle speed V, the respective vehicle wheel speeds Nw, and the like. Accordingly, a situation close to front wheel driving occurs and the fuel efficiency is improved. In addition, the driving force computation unit 104 reduces the driving force distribution to the rear wheels 16 so as to prevent a tight braking phenomenon during low-speed turning.

The clutch control unit 106 outputs respective commands signals to the front side actuator 50 switching the disconnection state of the front side clutch 40 and the electromagnetic solenoid (not illustrated) that controls the transmission torque of the coupling 54 for the driving state determined by the driving state determination unit 102 and the front-rear wheel driving force distribution calculated by the driving force computation unit 104. Specifically, in a case where the driving state of the vehicle 10 is determined to be the 2WD_d traveling by the driving state determination unit 102, the clutch control unit 106 outputs commands for releasing the front side clutch 40 and turning the transmission torque of the coupling 54 into zero to the front side actuator 50 and the electromagnetic solenoid, respectively. In a case where the driving state of the vehicle 10 is determined to be the 4WD traveling by the driving state determination unit 102, the clutch control unit 106 outputs commands for connecting (engaging) the front side clutch 40 and controlling the transmission torque of the coupling 54 to the front side actuator 50 and the electromagnetic solenoid, respectively, for 4WD traveling in the front-rear wheel driving force distribution calculated by the driving force computation unit 104.

During a transition from 2WD_d traveling to 4WD traveling in particular, the clutch control unit 106 outputs a command for generating the transmission torque in the coupling 54 to the electromagnetic solenoid first and controls the electromagnetic solenoid so that the coupling 54 is engaged when the disconnect state is canceled. This is to realize synchronization between the rotation speeds of the relative rotating members of the front side clutch 40 (the first rotating member 36 and the second rotating member 38) by increasing the rotation speed of the propeller shaft 28 whose rotation is substantially stopped for connection of the front side clutch 40 to at least a predetermined rotation speed. In a case where the synchronization between the rotation speeds of the relative rotating members of the front side clutch 40 is determined, the clutch control unit 106 outputs a command for connecting the front side clutch 40 to the front side actuator 50. Then, the clutch control unit 106 outputs the command for generating the transmission torque in the coupling 54 to the electromagnetic solenoid for the front-rear wheel driving force distribution calculated by the driving force computation unit 104. A series of the above-described control procedure performed during the transition from 2WD_d traveling to 4WD traveling is a normal 4WD transition control procedure.

The clutch control unit 106 determines whether or not the rotation speeds of the relative rotating members of the front side clutch 40 are synchronized based on, for example, whether or not the propeller shaft rotation speed Np reaches a predetermined rotation speed. The predetermined rotation speed is, for example, a rotation speed for synchronizing the rotation speeds of the relative rotating members of the front side clutch 40. The rotation speed for the synchronization is, for example, a synchronization determination threshold N1 that is obtained by converting a synchronizable rotation speed obtained by subtracting a synchronizable maximum rotation speed difference ΔNsync from the rotation speed of the first rotating member 36 into a rotation speed on the propeller shaft 28. In addition, the rotation speed of the first rotating member 36 may be a rotation speed that is directly detected by a rotation speed sensor (not illustrated). The rotation speed of the first rotating member 36 may be a rotation speed that is converted from the transmission output rotation speed Nout. In addition, the synchronizable maximum rotation speed difference ΔNsync is, for example, a synchronization-allowed rotation speed difference pre-defined as the maximum value of the absolute value of the rotation speed difference between the rotation speed of the first rotating member 36 and the rotation speed of the second rotating member 38 at which the connection (engagement) of the front side clutch 40 is possible. Accordingly, the clutch control unit 106 calculates the synchronization determination threshold N1 based on the rotation speed of the first rotating member 36. The clutch control unit 106 determines whether or not the rotation speeds of the relative rotating members of the front side clutch 40 are synchronized based on whether or not the propeller shaft rotation speed Np exceeds the synchronization determination threshold N1.

During the transition from the 2WD_d traveling to the 4WD traveling, a certain period of time is required until the rotation speed of the propeller shaft 28 whose rotation is substantially stopped due to the engagement of the coupling 54 reaches the synchronization determination threshold N1. Accordingly, there is room for improvement relating to the responsiveness of the transition to the 4WD traveling. Herein, it is considered that a quick cancel of the disconnect state is more preferable than the suppression of a shock in canceling the disconnect state (cancel shock) if the degree of urgency of the transition to the 4WD traveling is high. It is considered that the suppression of the cancel shock is more preferable than a quick cancel of the disconnect state if the degree of urgency of the transition to the 4WD traveling is low. Also considerable are a case where the transition to the 4WD traveling is essential and a case where the transition to the 4WD traveling is desirable although the transition to the 4WD traveling is inessential. In addition, it is considered to be difficult to shorten the period of time until the propeller shaft rotation speed Np reaches the synchronization determination threshold N1 and suppress the shock of the cancel of the disconnect state at the same time.

When the disconnect state is canceled, the clutch control unit 106 controls the engagement force of the coupling 54 in accordance with a plurality of types of cancel conditions for determining the cancel of the disconnect state. In other words, when the disconnect state is canceled, the clutch control unit 106 sets the increasing gradient of the propeller shaft rotation speed Np in accordance with the plurality of types of cancel conditions. Then, the clutch control unit 106 engages the front side clutch 40 after the propeller shaft rotation speed Np reaches the synchronization determination threshold N1.

In this embodiment, two cancel conditions are shown as examples of the plurality of types of cancel conditions, one being a cancel condition in which the period of time until the propeller shaft rotation speed Np in canceling the disconnect state reaches the synchronization determination threshold N1 is a relatively long period of time and the other being (that is) a cancel condition in which the period of time until the propeller shaft rotation speed Np reaches the synchronization determination threshold N1 is a relatively short period of time (hereinafter, referred to as a short-time cancel condition S). The period of time until the propeller shaft rotation speed Np in canceling the disconnect state reaches the synchronization determination threshold N1 being a relatively long period of time as described above means that the average increasing gradient of the propeller shaft rotation speed Np is relatively small (first increasing gradient). Hereinafter, the cancel condition in which the period of time until the propeller shaft rotation speed Np in canceling the disconnect state reaches the synchronization determination threshold N1 is a relatively long period of time as described above will be referred to as a long-time cancel condition L. The period of time until the propeller shaft rotation speed Np reaches the synchronization determination threshold N1 being a relatively short period of time means that the average increasing gradient of the propeller shaft rotation speed Np is relatively large (second increasing gradient). Hereinafter, the cancel condition in which the period of time until the propeller shaft rotation speed Np reaches the synchronization determination threshold N1 is a relatively short period of time will be referred to as the short-time cancel condition S. The long-time cancel condition L is, for example, a cancel condition in which the degree of urgency of the transition to the 4WD traveling is low. In the long-time cancel condition L, the suppression of the shock of the cancel of the disconnect state is given priority over the quick cancel of the disconnect state. The short-time cancel condition S is, for example, a cancel condition in which the degree of urgency of the transition to the 4WD traveling is high. In the short-time cancel condition S, the quick cancel of the disconnect state is given priority over the suppression of the shock of the cancel of the disconnect state. Accordingly, in the case of the long-time cancel condition L, the predetermined gradient in increasing the propeller shaft rotation speed Np by using the clutch control unit 106 is, for example, the increasing gradient of the propeller shaft rotation speed Np that is pre-defined so as to suppress the cancel shock. In the case of the short-time cancel condition S, the predetermined gradient in increasing the propeller shaft rotation speed Np by using the clutch control unit 106 is, for example, the increasing gradient of the propeller shaft rotation speed Np that is pre-defined so that the rotation speeds of the relative rotating members of the front side clutch 40 are synchronized as early as possible.

The electronic control unit 100 is also provided with a traveling state determination unit 108 so as to determine the satisfaction of the long-time cancel condition L. The traveling state determination unit 108 determines that the long-time cancel condition L is satisfied when, for example, a determination for transition to 4WD traveling is predicted during 2WD_d traveling. Specifically, the traveling state determination unit 108 determines that the long-time cancel condition L is satisfied when it is predicted that the driving force change exceeds the driving force change threshold, when it is predicted that the predetermined vehicle wheel speed difference occurs in any one of the rotation speed differences between the respective vehicle wheels (for example, between the front wheels 14 and the rear wheels 16), or it is predicted that any one of the understeer state and the oversteer state occurs during 2WD_d traveling.

Hereinafter, each of the predictions described above will be described in detail. When the vehicle has a deceleration tendency regardless of a substantially constant accelerator opening θacc as in uphill road traveling or when the vehicle is traveling in the vicinity of an exit of a corner, the accelerator pedal may be increasingly depressed thereafter. Accordingly, it can be predicted that the driving force change exceeds the driving force change threshold. During traveling on a low μ road such as a snow-covered road and a frozen road, wheel slip may occur as a result of accelerator ON. Accordingly, it can be predicted that the predetermined vehicle wheel speed difference occurs in any one of the rotation speed differences between the respective vehicle wheels. During traveling on a low μ road in the presence of a deceleration tendency as in uphill road traveling, accelerator ON is likely to occur thereafter and wheel slip may occur. Accordingly, it can be predicted that the predetermined vehicle wheel speed difference occurs in any one of the rotation speed differences between the respective vehicle wheels. During traveling on a low μ road and a winding road, the actual yaw rate Ryaw is considered to be likely to deviate from the target yaw rate Ryawtgt. Accordingly, it can be predicted that any one of the understeer state and the oversteer state occurs. Accordingly, the traveling state determination unit 108 predicts whether or not the driving force change exceeds the driving force change threshold, predicts whether or not the predetermined vehicle wheel speed difference occurs in any one of the rotation speed differences between the respective vehicle wheels, or predicts whether or not any one of the understeer state and the oversteer state occurs based on at least one of the states of the low μ road, the uphill road, and the steering.

The traveling state determination unit 108 determines whether or not the traveling road is a predetermined low μ road based on the outside air temperature THair and the like. In addition, the traveling state determination unit 108 determines whether or not the traveling road is a predetermined uphill road based on a comparison between a reference acceleration with respect to the accelerator opening θacc and the actual longitudinal acceleration Gx and the like or based on gradient information from a gradient sensor (not illustrated). In addition, the traveling state determination unit 108 determines the state of steering based on at least one of the longitudinal acceleration Gx, the lateral acceleration Gy, the yaw rate Ryaw, and the steering angle θsw. In addition, the traveling state determination unit 108 may determine an uphill road, the vicinity of an exit of a corner, a winding road, and the like based on information from a navigation system (not illustrated) or the like.

The driving state determination unit 102 determines that the short-time cancel condition S is satisfied when, for example, the driving force change exceeds the driving force change threshold, the predetermined vehicle wheel speed difference occurs in any one of the rotation speed differences between the respective vehicle wheels (for example, between the front wheels 14 and the rear wheels 16), and any one of the understeer state and the oversteer state occurs during 2WD_d traveling.

In a case where it is determined by the traveling state determination unit 108 that the long-time cancel condition L is satisfied, the clutch control unit 106 controls the coupling 54 to be being engaged so that the propeller shaft rotation speed Np increases at an average increasing gradient at which the average increasing gradient is relatively small. The average increasing gradient is an average increasing gradient in which the period of time until the propeller shaft rotation speed Np reaches the synchronization determination threshold N1 is a relatively long period of time. In a case where it is determined by the driving state determination unit 102 that the short-time cancel condition S is satisfied, the clutch control unit 106 controls the coupling 54 to be being engaged so that the propeller shaft rotation speed Np increases at an average increasing gradient at which the average increasing gradient is relatively large. The increasing gradient is a increasing gradient in which the period of time until the propeller shaft rotation speed Np reaches the synchronization determination threshold N1 is a relatively short period of time. In a case where it is determined by the driving state determination unit 102 that the short-time cancel condition S is satisfied during the control of the engagement of the coupling 54 in which the period of time until the propeller shaft rotation speed Np reaches the synchronization determination threshold N1 is a relatively long period of time, the clutch control unit 106 switches the control of the engagement of the coupling 54 to that in which the period of time until the propeller shaft rotation speed Np reaches the synchronization determination threshold N1 is a relatively short period of time.

FIG. 3 is a flowchart showing a main part of a control operation by the electronic control unit 100, that is, a control operation for suppressing the shock in canceling the disconnect state or quickly canceling the disconnect state in accordance with the degree of urgency of transition to 4WD traveling. The flowchart is repeatedly executed in an extremely short cycle time of, for example, approximately several msec to dozens of msec. FIG. 4 is an example of a time chart for a case where the control operation that is illustrated in the flowchart in FIG. 3 is executed.

According to FIG. 3, an operation state and a vehicle state are acquired first based on, for example, the various actual values based on the detection signals from the various sensors in Step (hereinafter, Step will be omitted) S10 corresponding to the driving state determination unit 102. Then, in S20 corresponding to the driving state determination unit 102, it is determined, for example, whether or not the 2WD_d traveling is being performed. In a case where the determination in S20 is positive, it is determined, for example, whether or not the traveling road is a low id road in S30 corresponding to the traveling state determination unit 108. In a case where the determination in S30 is positive, it is determined, for example, whether or not the traveling road is an uphill road in S40 corresponding to the traveling state determination unit 108. In a case where the determination in S40 is positive, for example, the control of the engagement of the coupling 54 in which the period of time until the propeller shaft rotation speed Np reaches the synchronization determination threshold N1 is a relatively long period of time is initiated (refer to t1 moment in FIG. 4) in S50 corresponding to the clutch control unit 106. Then, in S60 corresponding to the clutch control unit 106, it is determined, for example, whether or not the rotation of the propeller shaft 28 whose rotation is in a substantially stopped state is initiated (refer to beyond t1 moment in FIG. 4). In a case where the determination in S60 is negative, S60 is repeatedly executed. In a case where the determination in S60 is positive, the coupling 54 is controlled to be being engaged in S70 corresponding to the clutch control unit 106 so that the propeller shaft rotation speed Np increases, for example, at an average increasing gradient at which the average increasing gradient is relatively small (refer to beyond t2 moment in FIG. 4). In a case where the determination in S30 or S40 is negative or after S70 described above, it is determined, for example, whether or not the short-time cancel condition S is satisfied in S80 corresponding to the driving state determination unit 102. In a case where the determination in S30 or S40 is negative or after S70 described above, it is determined, for example, whether or not any one of the rotation speed differences between the respective vehicle wheels exceeds the predetermined vehicle wheel speed difference in S80 corresponding to the driving state determination unit 102. In a case where the determination in S80 is positive, the control of the engagement of the coupling 54 is switched, for example, to that in which the period of time until the propeller shaft rotation speed Np reaches the synchronization determination threshold N1 is a relatively short period of time in S90 corresponding to the clutch control unit 106. The coupling 54 is controlled to be being engaged so that the propeller shaft rotation speed Np increases at an average increasing gradient at which the average increasing gradient is relatively large. In other words, the engagement force command value in controlling the engagement force of the coupling 54 is rapidly increased so that the coupling 54 is engaged (refer to beyond t3 moment illustrated by the solid line in FIG. 4). In a case where the determination in S80 is negative or after S90 described above, it is determined, for example, whether or not the propeller shaft rotation speed Np exceeds the synchronization determination threshold N1 in S100 corresponding to the clutch control unit 106. Whether or not the propeller shaft rotation speed Np exceeds the synchronization determination threshold N1 is, in other words, whether or not the rotation speeds of the relative rotating members of the front side clutch 40 are synchronized. In a case where the determination in S100 is negative, this routine is terminated. In a case where the determination in S100 is positive, a command for engaging the front side clutch 40 is output, for example, to the front side actuator 50 in S110 corresponding to the clutch control unit 106 (refer to t4 moment illustrated by the solid line or t5 moment illustrated by the dashed line in FIG. 4). In a case where the determination in S20 is negative or after S110 described above, it is determined, for example, whether or not a permission condition for transition of the driving state of the vehicle 10 from 4WD traveling to 2WD_d traveling is satisfied in S120 corresponding to the driving state determination unit 102. Examples of whether or not the permission condition for transition of the driving state of the vehicle 10 from 4WD traveling to 2WD_d traveling is satisfied include whether or not the driving force change in the vehicle 10 is smaller than the driving force change threshold and any one of the rotation speed differences between the respective vehicle wheels is within a predetermined vehicle wheel speed difference. This routine is terminated in a case where the determination in S120 is negative. In a case where the determination in S120 is positive, the engagement force command value of the coupling 54 is, for example, reduced in S130 corresponding to the clutch control unit 106 so that the driving force distribution to the rear wheels 16 side becomes zero. Then, in S140 corresponding to the clutch control unit 106, a command for releasing the front side clutch 40 is, for example, output to the front side actuator 50.

According to FIG. 4, t1 moment shows that the long-time cancel condition L is satisfied with a determination for transition to 4WD traveling being predicted to be made during 2WD_d traveling. As illustrated by the dashed line, the control of the engagement of the coupling 54 in which the period of time until the propeller shaft rotation speed Np reaches the synchronization determination threshold N1 is a relatively long period of time is initiated starting from t1 moment. Then, with respect to the initial value at the initiation of the control of the engagement of the coupling 54, the engagement force command value of the coupling 54 is increased by a predetermined value every time a predetermined period of time elapses. This is executed until the initiation of the rotation of the propeller shaft 28 whose rotation is in a substantially stopped state (t1 moment to t2 moment). From t2 moment when the rotation of the propeller shaft 28 is initiated, the propeller shaft rotation speed Np is increased at a relatively small average increasing gradient. Then, the front side clutch 40 is engaged when the propeller shaft rotation speed Np reaches the synchronization determination threshold N1 at t5 moment. As illustrated by the solid line, the short-time cancel condition S is satisfied when the wheel slip of the front wheels 14 is detected during the increase in the propeller shaft rotation speed Np (t3 moment). Starting from t3 moment, the control of the engagement of the coupling 54 in which the period of time until the propeller shaft rotation speed Np reaches the synchronization determination threshold N1 is a relatively long period of time is switched to the control of the engagement of the coupling 54 in which the period of time is a relatively short period of time. Then, the engagement force command value of the coupling 54 is rapidly increased for the engagement of the coupling 54 so that the propeller shaft rotation speed Np is increased at a relatively large increasing gradient. Then, the front side clutch 40 is engaged when the propeller shaft rotation speed Np reaches the synchronization determination threshold N1 at t4 moment.

According to this embodiment, the increasing gradient of the propeller shaft rotation speed Np is changed in accordance with the cancel condition in canceling the disconnect state when the disconnect state is canceled as described above. Accordingly, the aspect of the increase in the propeller shaft rotation speed Np can be changed in accordance with the degree of urgency of transition to 4WD traveling. Accordingly, the disconnect state can be canceled with the increasing gradient of the propeller shaft rotation speed Np relatively small and the shock suppressed in a case where the transition to 4WD traveling is not urgent. In a case where the transition to 4WD traveling is urgent, the disconnect state can be quickly canceled with the increasing gradient of the propeller shaft rotation speed Np relatively large. Accordingly, the shock in canceling the disconnect state can be suppressed or the disconnect state can be quickly canceled in accordance with the degree of urgency of transition to 4WD traveling.

According to this embodiment, the clutch control unit 106 increases the propeller shaft rotation speed Np at a predetermined gradient based on the difference between the lengths of time until the propeller shaft rotation speed Np reaches the synchronization determination threshold N1. The clutch control unit 106 engages the front side clutch 40 after the propeller shaft rotation speed Np reaches the synchronization determination threshold N1. Accordingly, the disconnect state can be appropriately canceled even in any case where the propeller shaft rotation speed Np is increased at different increasing gradients.

In addition, according to this embodiment, the long-time cancel condition L is satisfied when the occurrence of the predetermined vehicle wheel speed difference between the front wheels 14 and the rear wheels 16 is predicted or when the occurrence of any one of the understeer state and the oversteer state is predicted during 2WD_d traveling, and thus the disconnect state can be canceled with the increasing gradient of the propeller shaft rotation speed Np relatively small and the shock suppressed when the transition to 4WD traveling is not considered to be urgent in a traveling state where the transition to 4WD traveling is likely to be determined but the transition to 4WD traveling has yet to be determined.

In addition, according to this embodiment, the occurrence of the predetermined vehicle wheel speed difference is predicted or the occurrence of any one of the understeer state and the oversteer state is predicted based on at least one of the states of the low μ road, the uphill road, and the steering, and thus the occurrence of the predetermined vehicle wheel speed difference or the occurrence of any one of the understeer state and the oversteer state can be appropriately predicted.

In addition, according to this embodiment, the short-time cancel condition S is satisfied when the predetermined vehicle wheel speed difference occurs between the front wheels 14 and the rear wheels 16 or when any one of the understeer state and the oversteer state occurs during 2WD_d traveling. Accordingly, the disconnect state can be quickly canceled with the increasing gradient of the propeller shaft rotation speed Np relatively large when the transition to 4WD traveling is considered to be urgent in a traveling state where the transition to 4WD traveling is to be determined.

In addition, according to this embodiment, the clutch control unit 106 switches the engagement of the coupling 54 to that in which the increasing gradient is relatively large in a case where the short-time cancel condition S is satisfied during the engagement of the coupling 54 in which the increasing gradient of the propeller shaft rotation speed Np is relatively small. Accordingly, the disconnect state can be canceled even more quickly.

Next, another embodiment of the invention will be described. In the following description, the same reference numerals will be used to refer to parts common to the embodiments and description thereof will be omitted.

The long-time cancel condition L in which the degree of urgency of transition to 4WD traveling is low is not limited to the aspect according to the example of the first embodiment described above. For example, in a case where the driver's operation is performed with 4WD traveling being considered to be preferable, the degree of urgency of transition to 4WD traveling is considered to be low.

The case where the driver's operation is performed with 4WD traveling being considered to be preferable is, for example, when the downshift request DNon or the upshift request UPon is input to the electronic control unit 100 with the paddle switch 86 being operated by the driver. When the paddle switch 86 is operated, the driver is considered to aim for sporty traveling. Accordingly, it is considered that the driving force change is likely to become large and any one of the understeer state and the oversteer state is likely to occur.

In addition, the case where the driver's operation is performed with 4WD traveling being considered to be preferable is, for example, when the traveling mode selection switch 88 is operated by the driver and the snow mode ON SNOWon or the sport mode ON SPORTon is input to the electronic control unit 100. It is considered that traveling on the low μ road is highly likely when the traveling mode selection switch 88 is operated for the selection of the snow mode. The driver is considered to aim for sporty traveling when the traveling mode selection switch 88 is operated for the selection of the sport mode. Accordingly, it is considered that the driving force change is likely to become large and any one of the understeer state and the oversteer state is likely to occur.

Accordingly, when, for example, the paddle switch 86 is operated by the driver or the traveling mode selection switch 88 is operated by the driver and the snow mode or the sport mode is selected during 2WD_d traveling, the traveling state determination unit 108 determines that the long-time cancel condition L is satisfied.

Herein, even in a case where the degree of urgency of transition to 4WD traveling is low, the transition to 4WD traveling may be performed insofar as the transition to 4WD traveling can be performed earlier without any difference from the transition to 4WD traveling. If the transition to 4WD traveling is promptly executed in accordance with the execution of the shift of the transmission 18 after the shift determination, the shock of the cancel of the disconnect state can be misled into the shift shock. In addition, the operation of the paddle switch 86 and the operation of the traveling mode selection switch 88 are operations linked to the shift of the transmission 18. Accordingly, even in a case where the degree of urgency of the transition to 4WD traveling is not high, these operations can suffice with a delay of waiting until the shift is operated. Accordingly, in a case where it is determined that the shift of the transmission 18 is initiated during the control of the engagement of the coupling 54 by the satisfaction of the long-time cancel condition L, the clutch control unit 106 switches the control of the engagement of the coupling 54 to that in which the period of time until the propeller shaft rotation speed Np reaches the synchronization determination threshold N1 is a relatively short period of time.

In this embodiment, whether or not the long-time cancel condition L is satisfied is determined by the traveling state determination unit 108, in Steps corresponding to S30 and S40 in the flowchart that is illustrated in FIG. 3 for the first embodiment described above, based on whether or not the paddle switch 86 or the traveling mode selection switch 88 is operated by the driver. In addition, in Step corresponding to S80 in the flowchart that is illustrated in FIG. 3, whether or not the short-time cancel condition S is satisfied is determined by the driving state determination unit 102 by determining whether or not the shift of the transmission 18 is initiated.

As described above, effects similar to those of the first embodiment can be achieved by this embodiment. In addition, the long-time cancel condition L is satisfied when the paddle switch 86 or the traveling mode selection switch 88 is operated by the driver during 2WD_d traveling. Accordingly, when the driver's operation is performed with the transition to 4WD traveling being considered not to be urgent and 4WD traveling being considered to be preferable, the disconnect state can be canceled with the increasing gradient of the propeller shaft rotation speed Np relatively small and the shock suppressed.

In addition, according to the embodiments, the clutch control unit 106 switches the control of the engagement of the coupling 54 to that in which the increasing gradient of the propeller shaft rotation speed Np is relatively large in a case where it is determined that the shift of the transmission 18 is initiated during the control of the engagement of the coupling 54 by the satisfaction of the long-time cancel condition L. Accordingly, the cancel of the disconnect state can be executed with the increasing gradient relatively large for misleading into the shift shock of the transmission 18. In this case, the cancel of the disconnect state in which the increasing gradient is relatively small is already initiated, and thus the delay in shift control is suppressed.

The embodiments of the invention have been described in detail with reference to the accompanying drawings. The invention, however, is also applied to other aspects.

For example, each of the embodiments is realized independently in the embodiments described above. Each of the embodiments described above does not have to be realized independently. The embodiments described above may be realized in appropriate combination. For example, the technical idea of switching the control of the engagement of the coupling 54 to that in which the period of time until the propeller shaft rotation speed Np reaches the synchronization determination threshold N1 is a relatively short period of time in accordance with the execution of the shift of the transmission 18 described in the second embodiment described above can also be applied to the aspect of the realization in the first embodiment described above.

In the embodiments described above, the long-time cancel condition L and the short-time cancel condition S have been described as two of the plurality of types of cancel conditions. The invention is not limited thereto. For example, other cancel conditions such as a cancel condition LL and a cancel condition M may be set. The cancel condition LL is a cancel condition in which the period of time until the propeller shaft rotation speed Np reaches the synchronization determination threshold N1 is a period of time longer than that of the case of the long-time cancel condition L. The cancel condition M is a cancel condition in which the period of time until the propeller shaft rotation speed Np reaches the synchronization determination threshold N1 is a period of time shorter than that of the case of the long-time cancel condition L and longer than that of the case of the short-time cancel condition S. For example, a plurality of types of cancel conditions are set, divided by case based on the differences between the states of the low μ road, the uphill road, and the steering.

In the embodiments described above, the predetermined gradient in increasing the propeller shaft rotation speed Np when the cancel condition is satisfied may have a pre-defined value changing based on, for example, the differences between the states of the low μ road, the uphill road, and the steering. In addition, in the embodiments described above, the predetermined gradient in increasing the propeller shaft rotation speed Np when the cancel condition is satisfied may have a pre-defined value changing based on the presence or absence of the operations of the paddle switch 86 and the traveling mode selection switch 88. In addition, in the embodiments described above, the predetermined gradient varies only in accordance with the cancel condition and is a uniform (constant) increasing gradient in a certain cancel condition. The invention is not limited thereto. For example, if the average increasing gradient of a relatively small increasing gradient is smaller than the average increasing gradient of a relatively large increasing gradient, a changing value of the increasing gradient may be used during the course of the control in the same cancel condition.

In the embodiments described above, the coupling 54 is disposed between the rear differential 32 and the rear wheel axle 34L on the left side. However, the invention is not limited thereto. For example, the coupling 54 may be disposed between the propeller shaft 28 and the drive pinion 30. The coupling 54 may be disposed between the ring gear 32r and the differential case 32c. The coupling 54 may be disposed between the ring gear 32r and each of the right and left rear wheel axles 34R, 34L. In the aspect in which the couplings 54 are disposed between the ring gear 32r and the right and left rear wheel axles 34R, 34L as described above, the differential case 32c and the differential mechanism 32d are not essential. In addition, an additional disconnection mechanism (for example, a dog clutch) may also be disposed as a disconnect mechanism between the ring gear 32r and the rear wheel axles 34. In the vehicle 10 that is not provided with the additional disconnection mechanism (dog clutch herein), it may be impossible to completely stop the rotation of the predetermined rotating element described above (for example, the propeller shaft 28 or the like) during 2WD_d traveling as the drag of the multi-plate clutch 54c occurs even in a state where the coupling 54 is canceled. It is desirable that the disconnect mechanism is a mechanism for stopping the rotation of a predetermined rotating element. However, the disconnect mechanism also includes a mechanism for a state where rotation occurs to some extent due to the drag described above or the like. Providing the additional disconnection mechanism (dog clutch herein) is useful in that the rotation attributable to the drag or the like can be prevented.

In the embodiments described above, the coupling 54 is an electronically-controlled coupling. However, the invention is not limited thereto. For example, the coupling 54 may be a synchro mechanism-attached dog clutch. In a case where the synchro mechanism-attached dog clutch is adopted, the propeller shaft rotation speed Np is increased at the predetermined gradient by controlling a friction engagement force of the synchro mechanism. In the embodiments described above, the front side clutch 40 may be provided with a synchro mechanism. In this case, however, the engagement of the front side clutch 40 can be initiated from the moment of determination for transition to 4WD traveling.

In the embodiments described above, the front side clutch 40 is an electromagnetic dog clutch. However, the invention is not limited thereto. For example, the front side clutch 40 may be a dog clutch that is provided with a shift fork which axially moves a sleeve, is the shift fork being driven by an electrically-controllable or hydraulically-controllable actuator. In addition, the front side clutch 40 is a dog clutch. The invention is not limited thereto. The front side clutch 40 can be appropriately applied insofar as the front side clutch 40 is configured to disconnect the rotating elements from each other.

In the embodiments described above, the vehicle 10 is structured so that power is transmitted to the front wheels 14 all the time and the rear wheels 16 are auxiliary driving wheels. However, the invention is not limited thereto. For example, the vehicle 10 may be structured so that power is transmitted to the rear wheels 16 all the time and the front wheels 14 are auxiliary driving wheels. For example, the vehicle 10 may be a FR-based 4WD vehicle.

In the flowchart in FIG. 3 according to the embodiment described above, the control of the engagement force of the coupling 54 is initiated in S50 on condition that both S30 and S40 are positive. However, the invention is not limited thereto. For example, S50 may be executed on condition that at least any one of S30 and S40 is positive. In this manner, the aspect of the execution of the respective Steps in the flowchart in FIG. 3 can be appropriately changed within a permissible range.

In the embodiments described above, the paddle switch 86 has been described as an example of the manual transmission device. However, the invention is not limited thereto. For example, the manual transmission device may be a shift operation device that is provided with a shift position for manual shift mode selection and respective shift positions for upshift and downshift selection in the manual shift mode as shift lever operation positions.

In the embodiments described above, various automatic transmissions such as a planetary gear-type multi-speed transmission, a continuously variable transmission, and a synchromesh-type parallel two-shaft transmission (including a known DCT) have been described as examples of the transmission 18. However, the invention is not limited thereto. For example, the transmission 18 may be a known manual transmission or the transmission 18 is inessential insofar as the aspect of performing the control for transition to 4WD traveling is not executed in accordance with the shift of the transmission 18 as in the second embodiment described above.

In the embodiments described above, the vehicle 10 is provided with the paddle switch 86 (manual transmission device) and the traveling mode selection switch 88. However, the invention is not limited thereto. For example, at least any one of the paddle switch 86 (manual transmission device) and the traveling mode selection switch 88 may be provided insofar as the aspect of performing the control for transition to 4WD traveling is executed based on the driver's operation as in the second embodiment described above. In addition, the switches are inessential if the aspect of performing the control for transition to 4WD traveling based on the driver's operation is not executed.

In the embodiments described above, a gasoline engine or the like that is an internal combustion engine which generates power by fuel combustion has been described as an example of the driving force source. For example, another motor such as an electric motor can also be adopted alone or in combination with the engine.

In the embodiments described above, the electronic control unit may be configured to engage the other one of the first disconnection mechanism and the second disconnection mechanism after the rotation speed of the driving force transmission shaft reaches a predetermined rotation speed. According to the aspect described above, the disconnect state can be appropriately canceled even in any case where the rotation speed of the driving force transmission shaft is increased at the different increasing gradients.

In the embodiments described above, the increasing gradient includes a first increasing gradient and a second increasing gradient which is larger than the first increasing gradient. The electronic control unit may be configured to set, when traveling is performed in the disconnect state during 2WD traveling, the increasing gradient to the first increasing gradient (i) when the electronic control unit predicts that a predetermined vehicle wheel speed difference occurs between the main driving wheels and the auxiliary driving wheels as the condition or (ii) when the electronic control unit predicts that any one of an understeer state and an oversteer state occurs as the condition. According to the aspect described above, the disconnect state can be canceled with the increasing gradient being the first increasing gradient and the shock suppressed when the transition to 4WD traveling is not considered to be urgent in a traveling state where the transition to 4WD traveling is likely to be determined but the transition to 4WD traveling has yet to be determined.

In the embodiments described above, the electronic control unit is configured to predict whether or not the predetermined vehicle wheel speed difference occurs or predict whether or not any one of the understeer state and the oversteer state occurs based on at least one of a low μ road, an uphill road, or the state of steering. According to the aspect described above, the occurrence of the predetermined vehicle wheel speed difference or the occurrence of any one of the understeer state and the oversteer state can be appropriately predicted.

In the embodiments described above, the increasing gradient includes a first increasing gradient and a second increasing gradient which is larger than the first increasing gradient. The electronic control unit may be configured to set, when traveling is performed in the disconnect state during 2WD traveling, the increasing gradient to a second increasing gradient (i) when a predetermined vehicle wheel speed difference occurs between the main driving wheels and the auxiliary driving wheels as the condition or (ii) when any one of an understeer state and an oversteer state occurs as the condition. According to the aspect described above, the disconnect state can be quickly canceled with the increasing gradient being the second increasing gradient when the transition to 4WD traveling is considered to be urgent in a traveling state where the transition to 4WD traveling is to be determined.

In the embodiments described above, the increasing gradient includes a first increasing gradient and a second increasing gradient which is larger than the first increasing gradient. The electronic control unit may be configured to switch the increasing gradient from the first increasing gradient to the second increasing gradient when the condition which the second increasing gradient is required is satisfied while one of the first disconnection mechanism and the second disconnection mechanism is being engaged such that the increasing gradient is at the first increasing gradient. According to the aspect described above, the disconnect state can be canceled even more quickly.

In the embodiments described above, an automatic transmission may be further provided. The automatic transmission may be disposed in a power transmission path between the driving force source and the main driving wheels. The increasing gradient includes a first increasing gradient and a second increasing gradient which is larger than the first increasing gradient.

The electronic control unit may be configured to set, when traveling is performed in the disconnect state during 2WD traveling, the increasing gradient to the first increasing gradient (i) when a manual transmission device for manual shift of the automatic transmission is operated by a driver or (ii) when a mode selection device is operated by the driver such that a snow mode is selected, a gear ratio on a high vehicle speed side of the automatic transmission is likely to be selected in the snow mode compared to a normal mode. According to the aspect described above, when the driver's operation is performed with the transition to 4WD traveling being considered not to be urgent and 4WD traveling being considered to be preferable, the disconnect state can be canceled with the increasing gradient being the first increasing gradient and the shock suppressed.

In the embodiments described above, the increasing gradient includes a first increasing gradient and a second increasing gradient which is larger than the first increasing gradient. The electronic control unit may be configured to switch the increasing gradient from the first increasing gradient to the second increasing gradient when the condition which a shift of the automatic transmission is initiated while one of the first disconnection mechanism and the second disconnection mechanism is being engaged such that the increasing gradient is at the first increasing gradient. According to the aspect described above, the cancel of the disconnect state can be executed with the increasing gradient relatively large for misleading into the shift shock of the automatic transmission. In this case, the cancel of the disconnect state in which the increasing gradient is the first increasing gradient is already initiated, and thus the delay in change control is suppressed.

The above description is embodiments in any aspect and various modifications and improvements can be added to the invention based on the knowledge of those skilled in the art.

What is claimed is:

1. A four wheel drive vehicle comprising:
   main driving wheels;
   auxiliary driving wheels;
   a driving force source that outputs a power to the main driving wheels;
   a driving force transmission shaft having a driving force source end operatively connected to the driving force source and an opposite auxiliary driving wheels end operatively connected to the auxiliary driving wheels, the driving force transmission shaft configured to transmit a part of the power that the driving force source transmits to the main driving wheels to the auxiliary driving wheels during four wheel drive traveling, the driving force transmission shaft is part of a power transmission path between the driving force source and the auxiliary driving wheels;
   a first disconnection mechanism disposed on the driving force source end of the driving force transmission shaft;
   a second disconnection mechanism disposed on the auxiliary driving wheels end of the driving force transmission shaft, the first disconnection mechanism and the second disconnection mechanism being configured to move between an engaged position and a released position, in the engaged position the first disconnection mechanism and the second disconnection mechanism connect the power transmission path between the driving force source and the auxiliary driving wheels and in the released position the first disconnection mechanism and the second disconnection mechanism disconnect the power transmission path between the driving force source and the auxiliary driving wheels; and
   an electronic control unit configured to:
   (i) control one of the first disconnection mechanism and the second disconnection mechanism to be in the engaged position and then control the other one of the first disconnection mechanism and the second disconnection mechanism to be in the engaged position when a disconnect state is canceled, the disconnect state being a state where both the first disconnection mechanism and the second disconnection mechanism are in the released position; and (ii) set, when the disconnect state is canceled, an increasing gradient of a rotation speed of the driving force transmission shaft in accordance with a condition that the electronic control unit determines to cancel the disconnect state.

2. The four wheel drive vehicle according to claim 1, wherein the electronic control unit is configured to control the other one of the first disconnection mechanism and the second disconnection mechanism to be in the engaged position after the rotation speed of the driving force transmission shaft reaches a predetermined rotation speed.

3. The four wheel drive vehicle according to claim 1, wherein the increasing gradient includes a first increasing gradient and a second increasing gradient which is larger than the first increasing gradient, the electronic control unit is configured to set, when traveling is performed in the disconnect state during two wheel drive traveling, the increasing gradient to the first increasing gradient (i) when the electronic control unit predicts that a predetermined vehicle wheel speed difference occurs between the main driving wheels and the auxiliary driving wheels as the condition or (ii) when the electronic control unit predicts that any one of an understeer state and an oversteer state occurs as the condition.

4. The four wheel drive vehicle according to claim 3, wherein the electronic control unit is configured to predict whether or not the predetermined vehicle wheel speed difference occurs or predict whether or not any one of the understeer state and the oversteer state occurs based on at least one of a low μ road, an uphill road, or a state of steering.

5. The four wheel drive vehicle according to claim 1, wherein the increasing gradient includes a first increasing gradient and a second increasing gradient which is larger than the first increasing gradient, the electronic control unit is configured to set, when traveling is performed in the disconnect state during two wheel drive traveling, the increasing gradient to the second increasing gradient (i) when a predetermined vehicle wheel speed difference occurs between the main driving wheels and the auxiliary driving wheels as the condition or (ii) when any one of an understeer state and an oversteer state occurs as the condition.

6. The four wheel drive vehicle according to claim 1, wherein the increasing gradient includes a first increasing gradient and a second increasing gradient which is larger than the first increasing gradient, the electronic control unit is configured to switch the increasing gradient from the first increasing gradient to the second increasing gradient when a condition in which the second increasing gradient is required is satisfied while one of the first disconnection mechanism and the second disconnection mechanism is in the engaged position such that the increasing gradient is at the first increasing gradient.

7. The four wheel drive vehicle according to claim 1, further comprising:

an automatic transmission disposed in a power transmission path between the driving force source and the main driving wheels, wherein the increasing gradient includes a first increasing gradient and a second increasing gradient which is larger than the first increasing gradient, the electronic control unit is configured to set, when traveling is performed in the disconnect state during two wheel drive traveling, the increasing gradient to the first increasing gradient (i) when a manual transmission device for manual shift of the automatic transmission is operated by a driver or (ii) when a mode selection device, having a snow mode and a normal mode, is operated by the driver such that the snow mode is selected, wherein, in the snow mode, a gear ratio on a high vehicle speed side of the automatic transmission is selected as compared to the normal mode.

8. The four wheel drive vehicle according to claim 7, wherein the electronic control unit is configured to switch the increasing gradient from the first increasing gradient to the second increasing gradient when a condition in which a shift of the automatic transmission is initiated while one of the first disconnection mechanism and the second disconnection mechanism is in the engaged position such that the increasing gradient is the first increasing gradient.

9. A control apparatus for a four wheel drive vehicle, the four wheel drive vehicle including:

main driving wheels;

auxiliary driving wheels;

a driving force source that outputs a power to the main driving wheels;

a driving force transmission shaft having a driving force source end operatively connected to the driving force source and an opposite auxiliary driving wheels end operatively connected to the auxiliary driving wheels, the driving force transmission shaft configured to transmit a part of the power that the driving force source transmits to the main driving wheels to the auxiliary driving wheels during four wheel drive traveling, the driving force transmission shaft is part of a power transmission path between the driving force source and the auxiliary driving wheels;

a first disconnection mechanism disposed on the driving force source end of the driving force transmission shaft; and a second disconnection mechanism disposed on the auxiliary driving wheels end of the driving force transmission shaft, the first disconnection mechanism and the second disconnection mechanism being configured to move between an engaged position and a released position, in the engaged position the first disconnection mechanism and the second disconnection mechanism connect the power transmission path between the driving force source and the auxiliary driving wheels and in the released position the first disconnection mechanism and the second disconnection mechanism disconnect the power transmission path between the driving force source and the auxiliary driving wheels;

the control apparatus comprising:

an electronic control unit configured to:

(i) control one of the first disconnection mechanism and the second disconnection mechanism to be in the engaged position and then control the other one of the first disconnection mechanism and the second disconnection mechanism to be in the engaged position when a disconnect state is canceled, the disconnect state being a state where both the first disconnection mechanism and the second disconnection mechanism are in the released position; and (ii) set, when the disconnect state is canceled, an increasing gradient of a rotation speed of the driving force transmission shaft in accordance with a condition that the electronic control unit determines to cancel the disconnect state.

10. The control apparatus according to claim 9, wherein the electronic control unit is configured to control the other one of the first disconnection mechanism and the second disconnection mechanism to be in the engaged position after the rotation speed of the driving force transmission shaft reaches a predetermined rotation speed.

11. The control apparatus according to claim 9, wherein the increasing gradient includes a first increasing gradient and a second increasing gradient which is larger than the first increasing gradient, the electronic control unit is configured to set, when traveling is performed in the disconnect state during two wheel drive traveling, the increasing gradient to the first increasing gradient (i) when the electronic control unit predicts that a predetermined vehicle wheel speed difference occurs between the main driving wheels and the auxiliary driving wheels as the condition or (ii) when the electronic control unit predicts that any one of an understeer state and an oversteer state occurs as the condition.

12. The control apparatus according to claim 11, wherein the electronic control unit is configured to predict whether or not the predetermined vehicle wheel speed difference occurs or predict whether or not any one of the understeer state and the oversteer state occurs based on at least one of a low μ road, an uphill road, or a state of steering.

13. The control apparatus according to claim 9, wherein the increasing gradient includes a first increasing gradient and a second increasing gradient which is larger than the first increasing gradient, the electronic control unit is configured to set, when traveling is performed in the disconnect state during two wheel drive traveling, the increasing gradient to the second increasing gradient (i) when a predetermined vehicle wheel speed difference occurs between the main driving wheels and the auxiliary driving wheels as the condition or (ii) when any one of an understeer state and an oversteer state occurs as the condition.

14. The control apparatus according to claim 9, wherein the increasing gradient includes a first increasing gradient and a second increasing gradient which is larger than the first increasing gradient, the electronic control unit is configured to switch the increasing gradient from the first increasing gradient to the second increasing gradient when a condition in which the second increasing gradient is required is satisfied while one of the first disconnection mechanism and the second disconnection mechanism is in the engaged position such that the increasing gradient is at the first increasing gradient.

15. The control apparatus according to claim 9, further comprising:

an automatic transmission disposed in a power transmission path between the driving force source and the main driving wheels, wherein the increasing gradient includes a first increasing gradient and a second increasing gradient which is larger than the first increasing gradient, the electronic control unit is configured to set, when traveling is performed in the disconnect state during two wheel drive traveling, the increasing gradient to the first increasing gradient (i) when a manual transmission device for manual shift of the automatic transmission is operated by a driver or (ii) when a mode selection device, having a snow mode and a normal mode, is operated by the driver such that the snow mode is selected, wherein, in the snow mode, a gear ratio on a high vehicle speed side of the automatic transmission is selected as compared to the normal mode.

16. The control apparatus according to claim 15, wherein the electronic control unit is configured to switch the increasing gradient from the first increasing gradient to the second increasing gradient when a condition in which a shift of the automatic transmission is initiated while one of the first disconnection mechanism and the second disconnection mechanism is in the engaged position such that the increasing gradient is the first increasing gradient.

* * * * *